(12) United States Patent
Lai (10) Patent No.: US 12,258,936 B2
(45) Date of Patent: Mar. 25, 2025

(54) CABLE-STAYED BLADE STRUCTURE FOR VARIABLE SPEED WIND TURBINES

(71) Applicant: Ba At Lai, Hanoi (VN)

(72) Inventor: Ba At Lai, Hanoi (VN)

( * ) Notice: Subject to any disclaimer, the term of this patent is extended or adjusted under 35 U.S.C. 154(b) by 0 days.

(21) Appl. No.: 18/284,323

(22) PCT Filed: Oct. 20, 2022

(86) PCT No.: PCT/VN2022/000010
§ 371 (c)(1),
(2) Date: Sep. 27, 2023

(87) PCT Pub. No.: WO2023/077175
PCT Pub. Date: May 4, 2023

(65) Prior Publication Data

US 2024/0159213 A1 May 16, 2024

(30) Foreign Application Priority Data

Oct. 27, 2021 (VN) .............................. 1-2021-06821

(51) Int. Cl.
*F03D 1/06* (2006.01)
*F03D 80/30* (2016.01)

(52) U.S. Cl.
CPC ......... *F03D 1/0675* (2013.01); *F03D 1/0658* (2013.01); *F03D 80/30* (2016.05); *F05B 2240/917* (2013.01)

(58) Field of Classification Search
CPC .... F03D 1/0658; F03D 1/0675; F03D 1/0679; F03D 80/30; F05B 2240/917
See application file for complete search history.

(56) References Cited

U.S. PATENT DOCUMENTS 4,316,699 A * 2/1982 Schott .................... F03D 1/065
416/139
4,403,916 A 9/1983 Skelsky
(Continued)

FOREIGN PATENT DOCUMENTS

CN 108194269 A 6/2018
WO WO2016011462 A 1/2016

OTHER PUBLICATIONS

International Search Report cited in corresponding VN application PCT/VN2022/000010 dated Dec. 8, 2022.

*Primary Examiner* — Sang K Kim
(74) *Attorney, Agent, or Firm* — BACON & THOMAS, PLLC (57) ABSTRACT

The present invention presents a structure for a set of cable-stayed blades for variable-speed wind turbines with the aim of manufacturing low-cost, large-capacity wind turbines with blades of up to 200 meters long, do not rotate to change the tilt of the wing, insulated from turbine shaft, the structure includes the steel tube at the center of the central hub for affixing the blade set onto the head of the wind turbine shaft, a tower to extend the turbine vertical axis for mounting stay cables which are fastened to the axial bearing blade frame, the blade body consists of a triangular prismatic frame with two rear-framing tubes parallel to each other to form the baselines for mounting blade surface sheets which can be furl/unfurled, the blades can be disassembled and placed into containers to be transported to the base of the turbine tower for assembly.

1 Claim, 3 Drawing Sheets

(56) References Cited

U.S. PATENT DOCUMENTS

| | | | |
|---|---|---|---|
| 8,629,570 B1* | 1/2014 | Kamenov | F03D 9/25 |
| | | | 290/55 |
| 9,249,777 B2* | 2/2016 | Khan | F03D 1/0658 |
| 2008/0124216 A1 | 5/2008 | Liao | |

* cited by examiner

CABLE-STAYED BLADE STRUCTURE FOR VARIABLE SPEED WIND TURBINES

TECHNICAL FIELD OF THE INVENTION

The present invention focuses on a cable-stayed blade structure for variable-speed wind turbines, namely the arrangement of the bearing bars of the blade frame with the blade surface consisting of thin sheets that can be furled up and a system of stay cables to carry the turbine axial force for the blades.

TECHNICAL CONDITIONS FOR THE INVENTION

Wind turbines currently use blades with a monolithic structure there is no frame for the blades. The blades are always built so they can rotate therefore it is difficult to increase the length of the blades and because of this, the blades cannot obtain much wind energy. Besides, there is no way to find the best inclination angle of the blades to get the most energy from the wind.

Patent documents GB 191016385 announced on Apr. 6, 1911, GB 191028025 announced on Aug. 3, 1911, and US 2012242084 announced on Sep. 27, 2012 presented the structure of a truss frame for wind turbine blades with the blade surface made of a thin sheet that can be rolled up. The thin blade surface has a well-aired back side which facilitates efficient wind energy harnessing, but it has not been shown in these documents how the tilt distribution along the length of the blade should be. The blade surface is made of a thin sheet which might sag easily, thus considerably increases the vertical thrust, making it difficult to keep the turbine steady. In the US patent document 2012242084, it is mentioned that the blade surface can be twisted by 2° to 10°, but it has not pointed out the rule for changing the angles of inclination of the blades. The fact that current large-capacity wind turbines have only 3 blades makes it impossible to maximize the swept area of the blades. Also, the current arrangement of the blade makes it difficult to increase the number of blades. Applying these inventions in the manufacture of blades for wind turbines will not allow for economic and technological criteria to be met.

Wind turbine manufacture technology today is based on the incorrect formula:

$$P = \frac{1}{2}\rho S v_1^3 C_p \quad (0-1)$$

where: $\rho$ is air density, S is swept area of the blades, v is the wind speed, $C_p$ is the Betz's coefficient.

This formula for calculating wind turbines' power capacity has been based on Betz's law. However, Betz's law has been proven wrong by the author of this invention because it considers wind as a point material to apply Newton's 2nd law.

In early 2018, I discovered that Betz's law was wrong to begin with because it applies a continuity equation regardless of the phenomenon that as wind goes through a wind turbine, it undergoes chaotic motions.

Since 2018, Betz's law has no longer been used by manufacturers of wind turbines. However, there has been no announcement as to which law is being applied. The information provided only include the magnitude of power capacity, rated wind velocity, blade swept area and power density 1 and 2. But we can see that the rated power capacity and published parameters today still follow the method of calculating power capacity of wind turbines according to Betz's law.

Consider the following detailed analysis:

A current wind turbine is claimed by the manufacturer to have a power capacity of 4 MW in wind speed of $v_1=12$ m/s; with a swept area of S=13,275 m2; power density 1 of 301 W/m2; power density 2 of 3.3 m2/KW.

Manufacturers use the Weibull distribution function and choose Weibull coefficient of 2, then take the power density of the wind at a common speed, then multiply by 2 to get the power density 1 and deduce the density capacity 2.

Considering the parameters of a turbine, we can find an illogical point that when multiplying the power density 1 by the swept area or dividing the swept area by the power density 2, the results will be equal to the power of the wind turbine:

301 W/m2*13275 m2=13275 m2: 3.3KW/m2=4000000 W=4 MW

On the other hand, the power density of a wind stream at the speed of 12 m/sis: $\frac{1}{2}\rho v_1^3 = 1058.4$ W/m$^2$ Comparing the power density 1 with that of a wind stream at the speed of 12 m/s we have:

301 W/m$^2 \approx 28.5\% \times 1058.4$ W/m$^2$

Thus, the power of the wind turbine when multiplying the power density 1 by the swept area is also:

$$P = \frac{1}{2}\rho S v_1^3 0.285 = 4000000 \text{ W} = 4 \text{ MW}$$

This is a specific case of equation (0-1) of Betz's law when Cp=0.285.

So the parameters announced by wind turbine manufacturers lead to the calculation of the power of wind turbine similar to that of Betz's law which has been proven wrong.

There is one thing illogical in today's calculations of wind turbine power capacity: to increase wind turbine power, it is just necessary to increase the blade length. It has caused the manufacture of wind turbine blades to be seriously erroneous in which wind turbine blades are made with the wrong technical features, making wind turbines' actual capacity to be very low.

In fact, the wind turbine blade is an obstacle to the movement of the wind stream. It is under the effect of frontal drag. There has been a formula to calculate this kind of drag in fluid mechanics; it is the force that causes the wind turbine to rotate. The calculation of this force must determine the wind speed acting on the blades while the turbine is rotating. The author of this invention found that the total wind speeds acting on the turbine blades at a distance $d_i$ from the center of rotation can be expressed as:

$$v_{Si}=k_i v_i - r_i \omega_i \cot \alpha_i.$$

where: $v_{Si}$ is the combined wind velocity that acts on blade element at time i; $k_i$ is the attenuation coefficient of wind speed of the blade segment in position i; $v_i$ is the velocity of the wind field at time i; $r_i$ is the distance from the rotational center to the blade element in position i; $\omega_i$ is the rotational speed of the turbine at time i; $\alpha_i$ is the angle of inclination of the blade element in position i.

When calculating the frontal drag of the wind on the blade of a wind turbine, it is necessary to divide the blade of the wind turbine into many very short blade elements in order to calculate the frontal drag on each blade element because varying distances from each blade element to the center of rotation will produce different torques. The shorter the blade element is, the higher the accuracy. The frontal drag of a blade element can be analyzed into two components: the component parallel to the turbine shaft does not make the turbine rotate. It only pushes the turbine down. The second component that is tangential to the rotational orbit is the component that produces work to make the turbine rotate.

Component $\vec{F}_{1\,ai}$ would push the blade element in the direction tangential to its rotational orbit to rotate the turbine blades. The magnitude of $\overline{F}_{1\,ai}$:

$$F_{1ai} = F_{ai}\cos\alpha_i = \frac{C_x}{2}\rho S_{ci}(k_i v_i - r_i\omega_i \cot\alpha_i)^2 \cos\alpha_i \sin^2\alpha_i;$$

on the condition that: $(k_i v_i - r_i\omega_i \cot\alpha_i) > 0$ ) & $(0° < \alpha_i < 90°)$ Formula (2-4) is used to calculate the force acting in the tangential direction to the rotational orbit of the blade elements.

"Function for bladed wind turbine power calculations" and expressed as follows:

$$P = \frac{C_x}{2}\rho a\omega_i \sum_{i=1}^{n} S_{ci} r_i (k_i v_i - r_i\omega_i \cot\alpha_i)^2 \cos\alpha_i \sin^2\alpha_i$$

on the condition that: $(k_i v_i - r_i\omega_i \cot\alpha_i) > 0$; $(0° < \alpha_i < 90°)$.

where P(w) is the turbine power at time i, $C_x$ (m²) is the frontal area drag coefficient; $\rho$ is the air density; a is the number of turbine blades; $\omega_i$ (rad/s) is the rotational speed of the turbine at time i; $S_{Ci}$ is the area of the blade segment in position i; $r_i$(m) is the distance from the rotational center to blade segment in position i; $k_i$ is the attenuation coefficient of wind speed of the blade segment in position i; $v_i$ (m/s) the wind field velocity at time i; $\alpha_i$ (0°) is the angle of inclination of the blade segment in position i.

The above-mentioned function of bladed wind turbine power calculations allows for quite accurate calculation of the power of wind turbines based on physical factors, which will be the basis for designing wind turbine blades with optimal technical features to contribute to the development of wind power production.

Such a complete change in the knowledge base of physics related to wind turbines is comparable to the study of transformation in astronomy in which Ptolemy's Geocentric System Theory was replaced by Copernican's Heliocentric System Theory.

The international patent application No. PCT/VN2016/000002; submission date: May 4, 2016; International publication number WO 2017/063003 for fixed-speed wind turbine blades used this theory but did not mention the structure of cable-stayed blades for variable-speed wind turbines.

These problems show that there is the need to find a way to make variable-speed wind turbines with large capacity while having the lowest prices for wind power.

TECHNICAL SPECIFICATION OF THE INVENTION

The purpose of the present invention is to make wind turbines with the largest capacity, the easiest to manufacture with the cheapest manufacturing costs, thus lowering the prices of wind power as much as possible. To achieve this purpose, the structure of the cable-stayed blades for variable-speed wind turbines is made as a cable-stayed truss frame to carry the blade surface made of a thin sheet that can be furled up, with optimal angle of inclination to capture the most wind energy.

The structure of the cable-stayed blades for variable-speed wind turbines consists of a cable-stayed truss frame to carry the wind turbine blades, which is made up of the components including: a central hub right in the center of the blade set with a core steel tube in the middle to attach the blades onto the turbine shaft. The two ends of the steel tube are connected to the rectangular blade mounting pad by the steel bars, forming a regular polygon prismatic blade mounting truss. The number of rectangular mounting pads is equal to the number of turbine blades. The steel tubes attached to the front edge of the blade mounting truss point forward and meet at the central-hub head flange. The central hub's head is fitted with an anemometer. The stay-cables are fastened onto the central-hub head flange and pulled down to the blade frame to carry the turbine axial force for the blades. The blade body is a triangular prismatic truss frame structure. The blade root has a flange to be attached to the blade mounting pad of central-hub blade mounting truss. The blade frame is fabricated with stay-cable support hubs to prevent sagging of the stay-cables. The blade frame is fitted with blade-cross bars for mounting the sliders onto which the blade surface sheets are mounted. The blade surface is a thin sheet of corrugated metal that does not sag horizontally and can be rolled up vertically thanks to the sliders. The blade surface is divided into many cells, each cell has a set of dual shafts to control the folding or unfolding of the blade. Each cell has a set of blade furling/unfurling set with sensors to control the folding or unfolding of the blade according to wind speeds. Cross-bars are arranged on the lower surface of the blades to stretch the vertical anti-sagging cables for the blade surface. The blades are also linked by connecting cables to increase rigidity.

The maximum force of the wind acting on a turbine blade element in the axial direction is calculated at the wind speed where the maximum power is achieved according to the following formula:

$$F_i = \frac{C_x}{2}\rho S_{ci}(k_i v_{Ci} - r_i\omega_{max}\cot\alpha_i)^2 \sin^3\alpha_i$$

where: F: is vertical axis force of the blade segment at position i; $C_x$: is the frontal area drag coefficient; $\rho$: is the air density; $S_{Ci}$: is the area of the blade segment at position i; $k_i$: is attenuation coefficient of wind speed in position i; $v_c$: is the velocity of the wind field at which the power is the highest; $r_i$: is the distance from the rotational center to the blade element in position i; $\omega_{max}$: is the highest angular velocity of the turbine; $\alpha_i$: is the angle of inclination of the blade element in position i.

Calculating the sum of the forces F, we can determine the force exerted by the wind on the turbine blades in the axial direction to calculate the force bearing capacity of the stay-cables or the blade frame and turbine mast.

The maximum force of the wind on a turbine blade element in the axial direction, at the maximum wind speed for the turbine to stop operating is used to calculate the bearing capacity of the stay-cables.

The angle of inclination of the blades are manufactured in the following steps:

First, select the wind speed $v_C$ for the turbine to have the highest capacity;

Secondly, select blade length and blade-tip linear velocity to calculate the highest rotational speed $\omega_{max}$ of the turbine;

Third, determine angles of inclination $\alpha_i$ of the blade surface at the distance $r_i$ from the rotational center using the parameters including: the length $r_i$, the wind speed yielding highest capacity $v_C$, the highest rotational speed $\omega_{max}$; take k=1 and angles $\alpha_i$ with magnitudes less than 89° to put into the equation that is shortened from "function for bladed wind turbine power calculations":

$$A_i = [kv_C - r_i\omega_{max}\cot\alpha_i]^2 \cos\alpha_i \sin^2\alpha_i$$

Make a table of Ai's values. We will find the values of $\alpha_i$ corresponding to $r_i$ where $A_i$ reaches the maximum value. Such $\alpha_i$'s values are chosen as the angle of inclination to produce the tilt of the blade surface at a position that is a distance $r_i$ away from the center of rotational axis.

The inclined surface formed by lines across the blade, at a distance $r_i$ from the center of rotation, inclined to the wind direction at an angle $\alpha_i$ is the inclination of the twisting the wind turbine blade surface. The angle of inclination of the blades is kept unchanged while the turbine is in operation.

When the wind velocity is greater than the wind velocity $v_C$ where the capacity is the highest, the blade is partly furled up so that the capacity does not exceed the maximum capacity. When the turbine stops working due to excessive wind, the entire blade surface is furled up.

As the number of blades increases and the blades do not rotate to change the angles of inclination, a truss frame structure for the blades can be applied with a cable-stayed system placed in the front to carry the turbine axial force for the blades, allowing for the blade width and length to be greatly increased. The angle of inclination of the blades is made to optimize wind energy harvesting, helping the turbines to achieve the highest capacity. As a result, it is possible to manufacture wind turbines with very large capacity that are capable of produce low-priced electricity from wind energy.

BRIEF DESCRIPTION OF THE DRAWINGS

FIG. 1 demonstrates overall design of one blade of the cable-stayed blade structure for variable-speed wind turbines: 1—turbine shaft; 2—steel tube; 3—connecting steel bars; 4—blade mounting pad; 5—central-hub-extending steels tubes; 6—central-hub-head flange for affixing stay cables; 7—anemometer, 8—stay cables; 9—blade-root flange; 10, 11, 12—steel tubes forming base structure for blade frame; 13—steel tubes connecting the steel tubes 10, 11, 12 to form the blade frame; 14—blade-cross tubes for mounting sliders; 15—sliders on blade surface; 16—blade surface; 17—round cladding panels for sliders; 18 cable-supporting hub; 19—cable-support frame; 20—blade-connecting cables; 21—blade furling/unfurling dual shaft; 22—blade surface-furling shaft; 23—support bars for blade-cross tubes 14 connected to rear-framing steel tubes.

DETAILED DESCRIPTION OF THE INVENTION

This section presents a detailed description of the invention of cable-stayed blades for variable-speed wind turbines. The description consists of the preferred implementation plan accompanied with drawings to illustrate. The cable-stayed blade structure is particularly suitable to be applied for wind turbines with variable rotational speeds, whose blade surface is made of thin sheets, making it possible to produce wind turbine blades with very large area in order to manufacture wind turbines with very large capacity.

Figure 1:
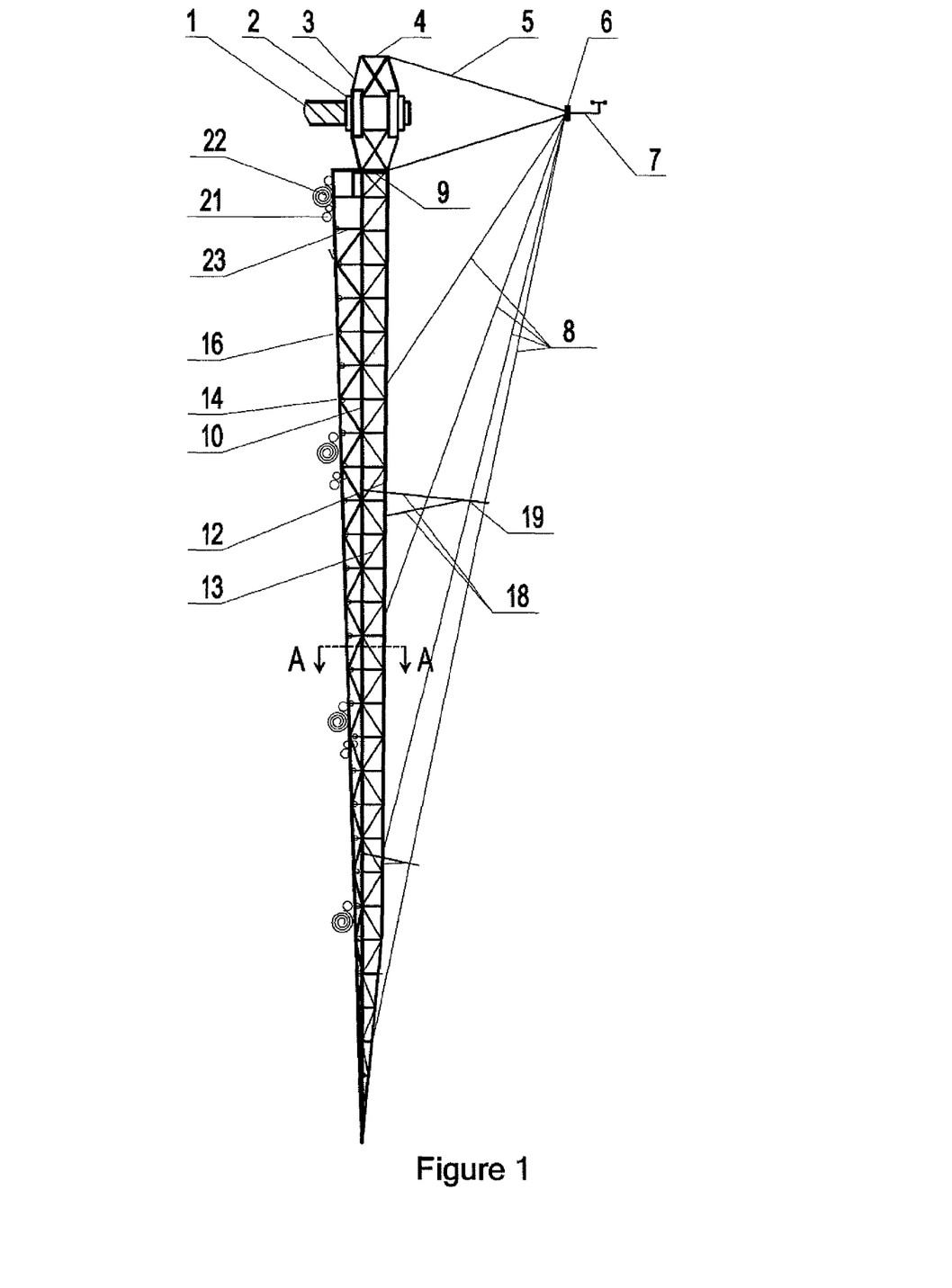
Figure 2:
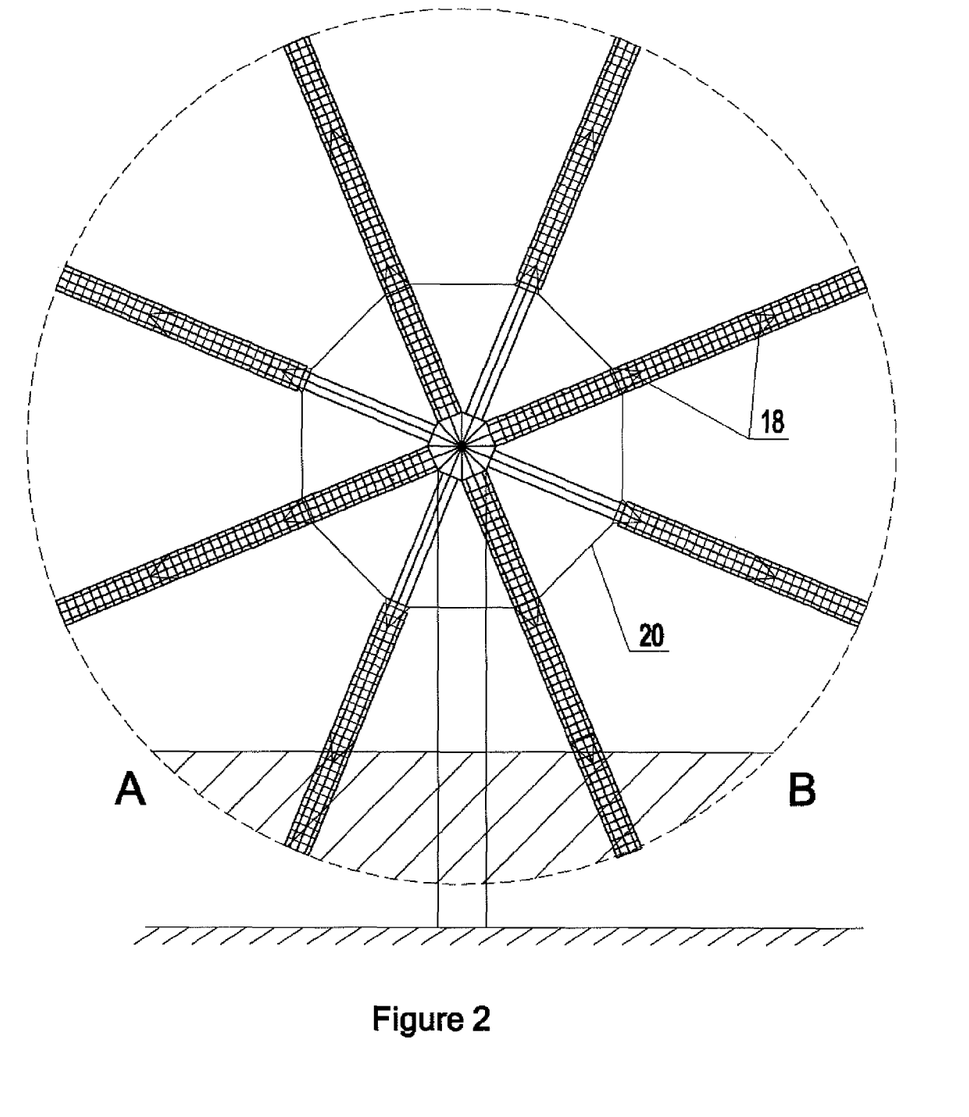
FIG. 2 shows the arrangement of blades for an 8-bladed wind turbine with blade length of 100 m and turbine tower measuring at 110 m; 18—stay-cable-supporting hub; 20—blade-connecting cables.

1. The structure of the cable-stayed blades for variable-speed wind turbines includes:

a—The central hub is in the exact center of the set of blades.

In the center of the central hub, there are the steel tubes 2 for attaching the blades onto the head of shaft 1 of the wind turbine.

The steel tubes 2 are connected to the blade mounting pads 4 by connecting-steel bars 3.

The steel tubes (2) consist of 3 layers, the middle layer is made of an insulating material between the blades and turbine shaft to prevent lightning strikes for the turbine, The blade mounting pads 4 form a regular polygonal prismatic blade mounting truss.

The turbine blades are fastened to the central hub by having the blade mounting pads 4 fitted with blade-root flanges 9. The height along the steel tubes 2 of the blade-mounting pads is greater than the height of the blades and the width of the blade-mounting pads is equal to that of the turbine blades. The number of blade-mounting pads 4 is equal to the number of blades.

Steel tubes 5 are installed at the point of intersection of the front edges of the blade-mounting pads 4 and reach toward the front of the turbine to form a cable-stayed tower. The steel tubes 5 converge at the flange 6 on top of the cable-stayed tower.

The flange 6 on top of cable-stayed tower is for mounting stay cables 8. The front side of flange 6 is fitted with the anemometer 7 so wind speeds will be measured more accurately than if the anemometer were placed on the top of the turbine, providing wind speed and wind direction values for the controllers. (FIG. 1).

b—The body of the wind turbine blades has a truss frame structure to increase rigidity and reduce the weight of the blades. It consists of the following components:

The blade-root flanges 9 are the starting points of the metal tubes 10, 11 and 12 forming the base prism-shaped frame for the blades. The tubes are made to taper towards the blade tip to reduce weight.

The centerlines of the metal tubes 10 and 11 are made to be parallel to each other, forming a plane perpendicular to the horizontal section and wind direction. The distance between the centerlines is equal to less than 90% of the blade width. The centerlines of the two framing tubes 10 and 11 are fixed and do not change when the turbine is in operation. It is easy to locate the position of the centerlines when assembling the turbine blades at the foot of the turbine mast. They serve as the baselines for the fabrication and assembly of the blade components.

The framing tubes 10, 11 and 12 are linked together by the connecting-metal tubes 13 forming the prismatic frame of the blades which has a very good bearing capacity for mounting the blade surface structures.

The tube 11 is the front-rotating framing tube because it is placed near the front edge of the blades, and as the turbine rotates, the wind touches the front edge of the blades and exits at the rear edge of the blades. The tube 10 which is positioned near the rear edge of the blades is called the rear-rotating framing tube. The front framing tube 12 is on the front side of the blades.

The framing tube 12 is equidistant from the two framing tubes 10 and 11. From the middle of the blade, the framing 12 tube is made to be in gradually reduced distance from the plane containing the centerlines of the framing tubes 10 and 11 until the distance is only 0.2 m to 0.5 m at the tip of the blade.

Figure 3:
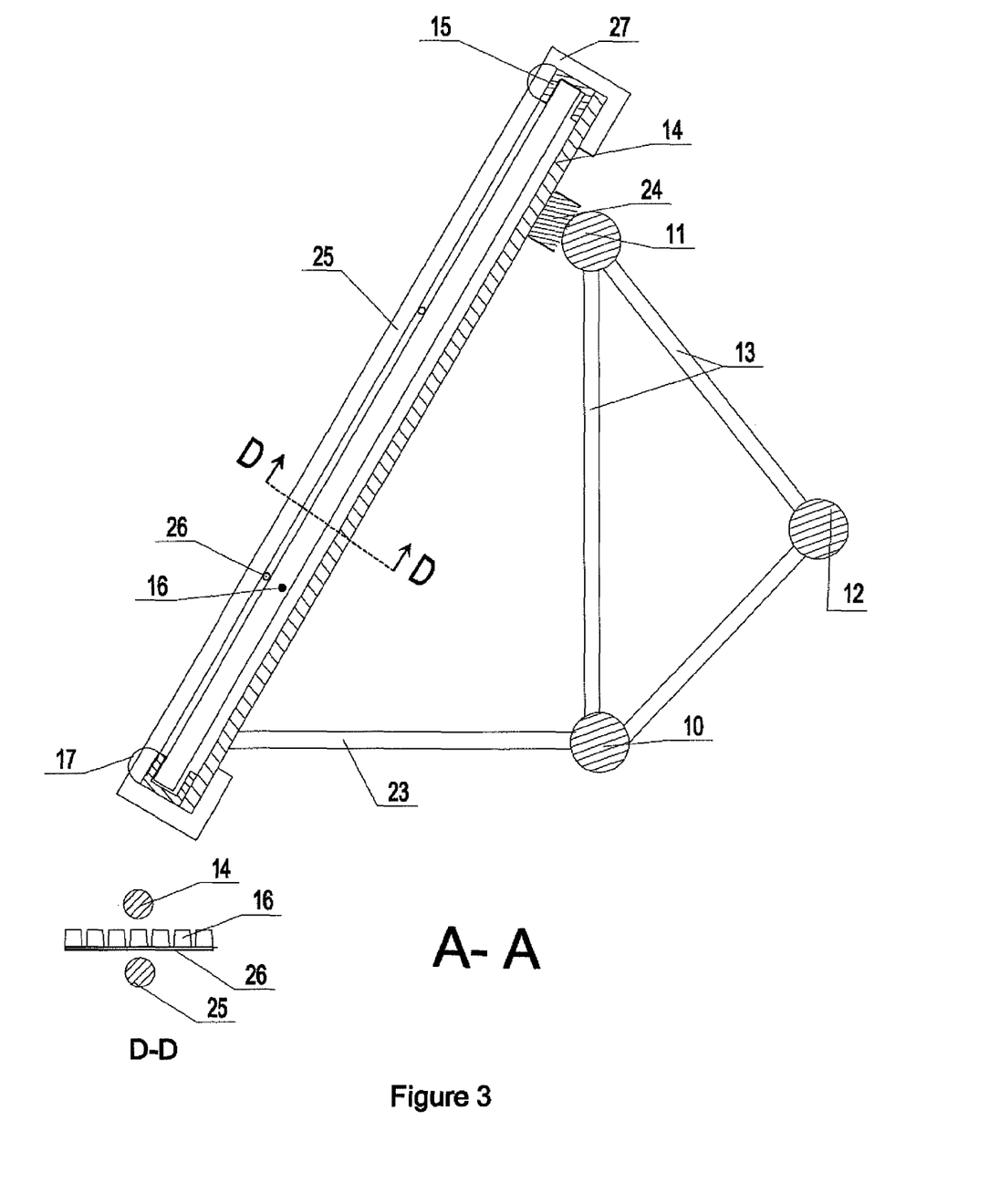
FIG. 3 shows the cross section of a blade. 10, 11, 12—framing-steel tubes; 13—steel tubes connecting the steel tubes 10, 11, 12 to form the blade frame; 14—blade-cross tubes for mounting sliders; 15—sliders on blade surface; 16—corrugated metal sheet for making blade surface; 17—round cladding panels for sliders; 23—support bar for the blade-cross bars 14 connected to rear framing steel tubes; 24—buffer pads between the blade-cross tubes 14 and the front framing steel tube 11; 25—bars for securing and stretching anti-sagging cables on the back of the blade surface; 26—anti-sagging cables; 27—clamps for mounting bars for securing and stretching anti-deflection cables 25; D-D—blade section below base frame.

Behind the framing tubes 10 and 11, there are the blade-cross tubes 14 whose length is equal to the width of the blade. The buffer pads 24 are to connect the tubes 14 to the front framing tube 11. The bars 23 are to connect the tube 14 to the rear framing tube 10. The bars 23 may include 2 or 3 bars to secure the tube 14 onto the framing tube 10. The tubes 14 are positioned approximately 1.5 m to 2 m apart from each other.

The turbine blade frame is fabricated in segments with length and width suitable for shipping by containers and assembled at the base of the turbine mast (FIG. 1).

c—Stay cable system:

The stay cables 8 stretch from the flanges 6 down to the blade-framing steel tubes 12 of blade body to withstand turbine axial thrust for turbine blades. Each blade can have 1 or more stay cables 8.

Each blade has triangular pyramid-shaped hubs mounted on the blade body. Each hub is made from 3 steel tubes 18. The 3 feet of the blade-hub are fixed on three framing tubes 10; 11; 12 to prevent sagging for the stay cables.

On the top of the blade hub, there is the supporting frame 19 to support the stay cables. There may be 1 or more blade hubs if the blades are very long, or no hubs when the turbine blades are shorter than 60 m.

The cables 20 connect the blades to increase their rigidity. (FIG. 1)

d—Wind turbine blade surface:

The outer edges behind the two ends of the blade-cross tubes 14 are fitted with pairs of blade surface sliders 15 along the length of each blade cell to carry the blade surface sheet 16, thus the inclination level of the blades will be nearly the same as the inclination level the blade-cross tubes 14.

The sliders 15, if not made round, will be covered by the round panels 17 to reduce wind resistance when the blade surface is rolled up.

The blade surface sheets 16 are made to be corrugated (FIG. 3; D-D) to prevent sagging across the blades and make it easy to be rolled up. The blade surface sheets can be made of metal or composite materials. The side with wide ridges and small grooves is turned to the front side of the blade surface.

The blade surface sheet is slid on two slider 15 to fold or unfold. The sliding trip of the blade surface sheet is operated by the dual shaft set 21. The dual shaft set 21 is operated by an electric motor controlled by the blade furling/unfurling sensor based on wind speeds.

The blade surface sheet is furled up or unfurled on the blade furling shaft 22 by an electric motor also controlled by the blade furling/unfurling sensor according to wind speeds. The blade furling shaft (22) is made to rotate synchronously with the blade-surface-stretching-cable shaft so that the blade surface is always straightened up during the furling/unfurling process. The blade surface is divided into many cells measuring at 20 m long each to ensure easy furling/unfurling.

To prevent sagging of the blade surface, the cable-stretching 25 are installed under the blade surface by the clamps 27 for stretching under-the-blade-surface support cables and to prevent sagging of the blade surface. (FIG. 3).

e—The way to calculate the thickness n (or n') of the buffer pads (24) and the length p (or p') of the bar (23) to install the blade-surface-cross tubes (14) at the position of the blade surface angle of inclination $\alpha_i$.

The angle of inclination of tube 14 at each position is the angle of inclination $\alpha_i$ of the blade surface and the wind direction at each position i along the length of the blade according. The distance between the two centerlines of the framing tube 11 and 10 is taken as m (m).

If in the horizontal direction, the distance from the framing tube 11 to the tube 14 is taken as n (m), then the distance between the framing tube 10 and the tube 14 at each position i in the horizontal direction will be calculated as:

$$p = m \cot \alpha_i + n \text{ (m)}.$$

If in the direction perpendicular to the tube 14, the distance from the framing tube 11 to the tube 14 is taken as n' (m), then the distance between the framing tube 10 and the tube 14 at each position i in the horizontal direction can be calculated p'=m cot $\alpha_i$+n' (m).

Then the buffer pads 24 and the bars 23 will have length measurements at each blade position to be mass-produced for each type of wind turbines.

2 The inclination levels of variable-speed wind turbine blades are determined as follows:

First, choose the wind speed $v_C$ at which the turbine has the maximum capacity;

Second, choose blade length and blade-tip linear velocity to calculate maximum turbine rotational speed $\omega_{max}$;

Third, find the angle of inclination $\alpha_i$ of the blade surface at a position whose distance from the center of rotation is taken as $r_i$, by using the parameters including: length $r_i$, wind speed for maximum power $v_C$, maximum rotational speed $\omega_{max}$; choose $k_i=1$, take the angles $\alpha_i$ with magnitudes less than 89° and put into the equation reduced from the "power function of bladed wind turbines":

$$A_i = [k_i v_C - r_i \omega_{max} \cot \alpha_i]^2 \cos \alpha_i \sin^2 \alpha_i$$

Tabulating the value of $A_i$, we will find the values of $\alpha_i$ corresponding to $d_i$ at which $A_i$ reaches the maximum value. These $\alpha_i$ values are chosen as the angles of inclination to manufacture the inclination level of the blade at a position a distance $d_i$ away from the center of the rotational axis.

The tilt surface formed by lines lying across the blade, a distance $r_i$ from the center of rotation, inclined to the wind direction at an angle $\alpha_i$ is the twisting level of the wind turbine blade surface. The angle of inclination of the blades remains unchanged while the turbine is in operation.

The turbine blade elements can still capture wind energy when the wind speeds in the sweep area vary by up to 6 m/s, so the turbine blades only need to be shorter than the mast by more than 5 m.

The allowed margins of error of the angle of inclination of the blades in the manufacture and installation processes is $1°.3$ greater or $1°.6$ less than the calculated angle of inclination so the turbine capacity is no more than 5% less than the maximum capacity. This is explained by the power graphs of the blade element as its tilt angle changes.

When the wind speed is greater than the wind speed $v_C$ where the power is the highest, the blade is partly furled up so that the capacity does not exceed the maximum capacity. When the turbine stops working dud to excessive wind, the entire blade surface is furled up.

The power to run the controllers can be obtained from the turbine when there are no thunderstorms or from a small wind turbine mounted on the main turbine blades to ensure insulation of the blades.

Implementation Example

Fabrication of a variable speed wind turbine with maximum generating capacity of 3.5 MW at a wind speed of 20 m/s in the delta region.

The turbine mast is 110 m high; the mast body's diameter is about 20 m. To turn the blades to the direction of the wind, the top of the mast is made into a circular track; the turbine base rotates around the central axis; the top of the base where the turbine blades are attached is mounted on the guide wheels running in circular direction on the mast-top track.

There are 8 blades, each measuring at 101 m long and 6 m, 4 of which have an area covering 92% of blade length, and 4 having an area covering 60% of blade length.

The blades have a cable-stayed frame structure. The central hub is 30 m long, with an 8-sided-regular-prism blade mounting frame truss; the blade-mounting pads measure 6 m wide by 5 m high; the core tube of the central hub is 3 m in diameter and 5 m long; each blade has 2 blade hubs 40 m from the central hub and 35 m from each other; the blades with 92 m-long blade surface sheets have 5 pairs of stay cables, and the blades with 60 m-long blade surface sheets have 4 pairs of stay cables.

The maximum force acting on the turbine blades when the wind reaches 25 m/s for the turbine to stop working is 270 N/m² of the blade. This is when the turbine furls up the blades and stops working. This force is used to calculate the tension of the stay cables.

The axial force at wind speed of 20 m/s is 150 N/m² and is used to calculate the mast head thrust.

The blade surface is made of corrugated metal sheets; each blade cell is less than 20 m long. The long blades whose surface sheet covers their entire length have 4 cells, and the short ones have 3 cells.

The capacity is stabilized when the wind speed exceeds the highest level by rolling up some blade cells. The turbine is protected in windstorms by furling up the entire blade surface.

The start-up wind speed is 4 m/s; the wind speed for the highest capacity is 20 m/s; the maximum wind speed for the turbine to stop operating is 25 m/s.

Inclination angles with respect to the wind direction at different positions of the blade surface at a wind speed of 20 m/s are as follows:

| Distance to turbine shaft (m). | Blade angle of inclination ($\alpha°$) |
| --- | --- |
| 8 | 64.05 |
| 10 | 65.95 |
| 12 | 67.7 |
| 14 | 69.3 |
| 16 | 70.7 |
| 18 | 72.05 |
| 20 | 73.15 |
| 22 | 74.15 |
| 24 | 75.05 |
| 26 | 75.95 |
| 28 | 76.7 |
| 30 | 77.35 |
| 32 | 78.05 |
| 34 | 78.65 |
| 36 | 79.2 |
| 38 | 79.7 |
| 40 | 80.155 |
| 42 | 80.55 |
| 44 | 80.95 |
| 46 | 81.3 |
| 48 | 81.6 |
| 50 | 81.9 |
| 52 | 82.2 |
| 54 | 82.45 |
| 56 | 82.7 |
| 58 | 82.95 |
| 60 | 83.15 |
| 62 | 83.35 |
| 64 | 83.55 |
| 66 | 83.75 |
| 68 | 83.95 |
| 70 | 84.1 |
| 72 | 84.25 |
| 74 | 84.4 |
| 76 | 84.55 |
| 78 | 84.7 |
| 80 | 84.85 |
| 82 | 84.95 |
| 84 | 85.05 |
| 86 | 85.15 |
| 88 | 85.25 |
| 90 | 85.35 |
| 92 | 85.45 |
| 94 | 85.55 |
| 96 | 85.65 |
| 98 | 85.75 |
| 100 | 85.8 |

Turbine power capacity obtained at different wind speeds:

| Wind speed v (m/s) | Power capacity P (KW) |
| --- | --- |
| 4 | 28 |
| 5 | 52 |
| 6 | 92 |
| 7 | 144 |
| 8 | 220 |
| 9 | 312 |
| 10 | 428 |
| 11 | 572 |
| 12 | 740 |
| 13 | 944 |
| 14 | 1176 |
| 15 | 1448 |
| 16 | 1760 |
| 17 | 2112 |
| 18 | 2504 |
| 19 | 2948 |
| 20 | 3440 |

POSSIBILITIES FOR INDUSTRIAL APPLICATION

Since the blades are fabricated to be non-rotating for variable speed wind turbines, the blades can be manufactured in very large lengths, possibly up to 200 m.

The blades only need to be about 10 m shorter than the turbine mast. With the height of today's cranes, it is possible to manufacture and install wind turbines with blades up to 200 m long, with a rotational speed of 0.5 rad/s (less than 5 rpm), to create wind turbines with very large capacity.

The blades are made into sections with maximum length of no more than 12 m and maximum width of 2.5 m, which are suitable to be transported by containers to the foot of the turbine tower mast and assembled very easily.

The installation is not difficult because the accuracy level required is not too high. The calibration to achieve an error factor for the blade inclination angle of no more than 0.5 degree is easy to get with available measuring tools.

BENEFITS BROUGHT ABOUT BY THE INVENTION

Produce wind turbines with a power capacity of up to 10 MW when the blades are nearly 200 m long.

Reduce wind power prices by 4 or 5 times compared current prices with new investments.

Renovate current wind turbines to increase the actual capacity by 3 to 4 times

The invention claimed is:

1. A cable-stayed blade structure for a variable speed wind turbine, comprising:
a blade set including a plurality of turbine blades;
a central hub at a center of the blade set; and
a turbine shaft,
wherein:
(a) the central hub includes a first steel tube at a center of the central hub for affixing the blade set to a wind turbine shaft, and wherein
the first steel tube is connected to blade mounting surfaces by connecting steel bars,
the turbine blades are assembled to the central hub by affixing the blade mounting surfaces to respective blade root flanges;
additional steel tubes are affixed at intersection points of front edges of the blade mounting surfaces and extend upwardly towards a front of the turbine to form a cable-stayed structure with the steel tubes converging at a top one of the flanges that is at a top of the cable-stayed structure,
the top one of the flanges is used for mounting the stay cables, and
an anemometer is attached to a front of the top one of the flanges, wherein:
(b) each of the blades includes a truss structure, one of said blade root flanges, a rotating front frame metal tubes and two rotating rear framing metal tubes, and wherein:
the front and rear framing metal tubes are mounted on a respective one of said blade root flanges and linked together by connecting metal tubes to form a blade base frame,
centerlines of the rear framing metal tubes and the front framing metal tube are parallel to each other, forming a plane perpendicular to a horizontal plane and to a wind direction when rotating and serving as baselines for fabrication and assembly of blade components,
the front framing metal tube is placed on a front side of the respective one of the blades, equidistant from the two rear framing tubes and from a middle of the respective blade,
a distance from the rotating front framing tube to the plane formed by the centerlines of the two rear framing tubes gradually decreases towards distal ends of the respective turbine blades,
two blade cross tubes having a same length as a blade width are provided on a rear side of the two rear framing metal tubes, said two blade cross tubes being attached to the front framing metal tube by buffer pads and to the rear framing metal tubes by bars,
whereby the turbine blades are configured to be divided into segments to facilitate shipping by containers and assembly at a base of the turbine mast,
wherein:
(c) the stay cables bear an axial thrust from the blades, each blade having one or more stay cables, and wherein:
the central hub is made of three said additional steel tubes fixed onto said two rear framing metal tubes and said front framing metal tube, to prevent sagging of the stay cables,
a supporting frame is provided on a top of the central hub to support the stay cables, and
the stay cables connect the blades to enhance their rigidity, and
wherein:
(d) an outer edge behind two ends of the blade cross tubes are fitted with pairs of blade sliders along the length of each blade cell to carry a blade surface sheet, and wherein:
the blade surface sheet is corrugated to facilitate retraction and extension of the blade surface sheet and to prevent sagging of the blade surface sheet across a horizontal direction of the wind turbine blade when the wind turbine is operated,
two sliders are provided to extend and retract the blade surface sheet, the blade surface sheet being divided into multiple sections,
sliding of the blade surface sheet is operated by a dual-shaft unit, the dual-shaft unit being operated by an electric motor controlled by a blade sensor to retract and extend the blade surface sheet according to wind speeds.

* * * * *